US006978306B2

(12) United States Patent
Miller et al.

(10) Patent No.: US 6,978,306 B2
(45) Date of Patent: Dec. 20, 2005

(54) MULTI-TIER VIDEO DELIVERY NETWORK

(75) Inventors: Thomas D. Miller, Alamo, CA (US); Adityo Prakash, Redwood Shores, CA (US); Hon Hing So, San Jose, CA (US); Kendall R. Haulotte, Tracy, CA (US)

(73) Assignee: PTS Corporation, San Jose, CA (US)

( * ) Notice: Subject to any disclaimer, the term of this patent is extended or adjusted under 35 U.S.C. 154(b) by 739 days.

(21) Appl. No.: 09/927,598

(22) Filed: Aug. 9, 2001

(65) Prior Publication Data
US 2002/0049977 A1 Apr. 25, 2002

Related U.S. Application Data

(60) Provisional application No. 60/224,748, filed on Aug. 10, 2000.

(51) Int. Cl.$^7$ ............................................. G06F 15/173
(52) U.S. Cl. ...................... 709/226; 709/225; 709/231; 709/232; 370/229; 370/230; 370/232
(58) Field of Search ................................. 709/202, 203, 709/217, 218, 219, 228, 229, 225, 226, 231, 709/232, 207, 227; 370/229, 230, 232

(56) References Cited

U.S. PATENT DOCUMENTS

| | | | |
|---|---|---|---|
| 6,104,705 A | 8/2000 | Ismail et al. ................. | 370/260 |
| 6,192,032 B1 | 2/2001 | Izquierdo ..................... | 370/230 |
| 6,317,462 B1 | 11/2001 | Boyce .................... | 375/240.27 |
| 6,363,413 B2 | 3/2002 | Kidder ........................ | 709/203 |
| 6,385,693 B1 * | 5/2002 | Gerszberg et al. .......... | 711/118 |
| 6,405,256 B1 * | 6/2002 | Lin et al. ..................... | 709/231 |
| 6,438,630 B1 * | 8/2002 | DeMoney ..................... | 710/56 |
| 6,466,978 B1 * | 10/2002 | Mukherjee et al. ......... | 709/225 |
| 6,490,705 B1 | 12/2002 | Boyce ......................... | 714/776 |
| 6,526,022 B1 * | 2/2003 | Chiu et al. ................... | 370/229 |
| 6,587,480 B1 * | 7/2003 | Higgins et al. ............. | 370/522 |
| 6,614,440 B1 * | 9/2003 | Bowen et al. ............... | 345/535 |
| 6,651,103 B1 * | 11/2003 | Markowitz et al. ......... | 709/231 |
| 6,657,955 B1 * | 12/2003 | Bonneau et al. ............ | 370/229 |
| 6,697,341 B1 * | 2/2004 | Roy ............................ | 370/260 |
| 6,707,852 B1 * | 3/2004 | Wang .................... | 375/240.12 |
| 6,708,213 B1 * | 3/2004 | Bommaiah et al. ......... | 709/226 |
| 6,754,196 B1 * | 6/2004 | Daane et al. ............... | 370/338 |
| 6,757,796 B1 * | 6/2004 | Hofmann ..................... | 711/159 |
| 6,760,749 B1 * | 7/2004 | Dunlap et al. .............. | 709/204 |
| 6,772,193 B1 * | 8/2004 | Igawa et al. ................ | 709/203 |
| 6,792,449 B2 * | 9/2004 | Colville et al. ............. | 709/215 |
| 6,801,964 B1 * | 10/2004 | Mahdavi ...................... | 710/35 |

* cited by examiner

Primary Examiner—Ario Etienne
Assistant Examiner—Sargon Nano
(74) Attorney, Agent, or Firm—Okamoto & Benedicto LLP

(57) ABSTRACT

A network for distributing broadband video content from its origination point to end users using a system of video servers, video storage devices, video caches and a broadband transmission network. Video material is initially received from content providers, encoded using a compression algorithm, and stored at a centralized location. Depending on the projected frequency of viewing of the content, it either remains stored at the centralized location for less frequently viewed content, or the projected frequently viewed content is proactively transmitted to storage systems located near the edge of the network close to the end users.

24 Claims, 4 Drawing Sheets

MULTI-TIER VIDEO DELIVERY NETWORK

CROSS-REFERENCES TO RELATED APPLICATIONS

The present disclosure claims priority from U.S. Provisional Pat. Application No. 60/224,748, filed Aug. 10, 2000, and entitled "Multi-Tier Video Delivery Network," the disclosure of which is hereby incorporated by reference for all purposes.

FIELD OF THE INVENTION

The present invention relates to broadband video content distribution networks utilizing Asynchronous Transfer Mode (ATM) or Internet Protocol (IP) backbone transport and a system of coordinated video servers, video storage devices, video caching devices and a video stream manager.

BACKGROUND OF THE INVENTION

In the current environment, with the explosion in popularity of the Internet for entertainment, commerce and other new uses (as well as the old uses), many users expect to get large bandwidth data sets, such as the data that makes up a video sequence, transmitted over packet-based networks, one example of which is the Internet. A packet-based network is a network where the data is transmitted in a non-continuous fashion, which allows the physical connection to be shared by multiple users simultaneously. The end-users expect to get such video data in real, or near real, time. Real-time video streams consume considerable bandwidth, as the recipient expects to receive video at its frame rate. Thus, if the frame rate is thirty frames per second, the recipient expects the network to deliver, in one second or less, enough data to decode thirty frames of video.

For some transmission media, such as direct satellite broadcasting systems or cable television networks, sending real-time video is easy and has in fact been done for years. Unfortunately, such networks are only useful where only a few (many numbering in the hundreds) video streams are being sent and they are being sent simultaneously to the recipients, and cannot readily be adapted to sending different video streams at possibly different times, to many different places on the network.

One disadvantage of streaming content out from a centralized source every time that content is requested, even if it is done in non-real-time, is the cost of handling full video connections to each of possibly millions of recipients. With high-bandwidth content and many recipients requesting a copy of the content, the network will slow under the weight of the traffic. One partial solution that attempts to overcome that disadvantage is to have the content streamed once from its source at a central location to many servers located nearer to recipients, thus reducing the number of copies of the data that have to flow over large portions of the network. While this solution would be useful if the content that is streamed to the network edge is used by recipients near each edge server, even more network bandwidth might be wasted as unused content is streamed from the central location to edge servers that might not ever serve up the content.

SUMMARY OF THE INVENTION

The invention relates to a system and method of delivering video over a communication system comprising of a system of video servers, video storage devices, video caches and a broadband transmission network. Video material is initially received from content providers, encoded using a compression algorithm, and stored at a centralized location. Depending on the projected frequency of viewing of the content, it either remains stored solely at the centralized location for less frequently viewed content, or the projected frequently viewed content is proactively transmitted to storage systems located on the edge of the network close to end users. In addition to storage, certain video material is streamed live to the end user from the centralized location or other encoding facilities, via the local center. The transmission between the centralized facility and the local center in controlled by a stream manager capable, based upon various criteria, of prioritizing the transmission of different video streams both live and previously stored, determining whether certain video data should be stored at the local center, distributing the total volume of video data over multiple networks.

DETAILED DESCRIPTION OF THE EMBODIMENTS

Figure 1:
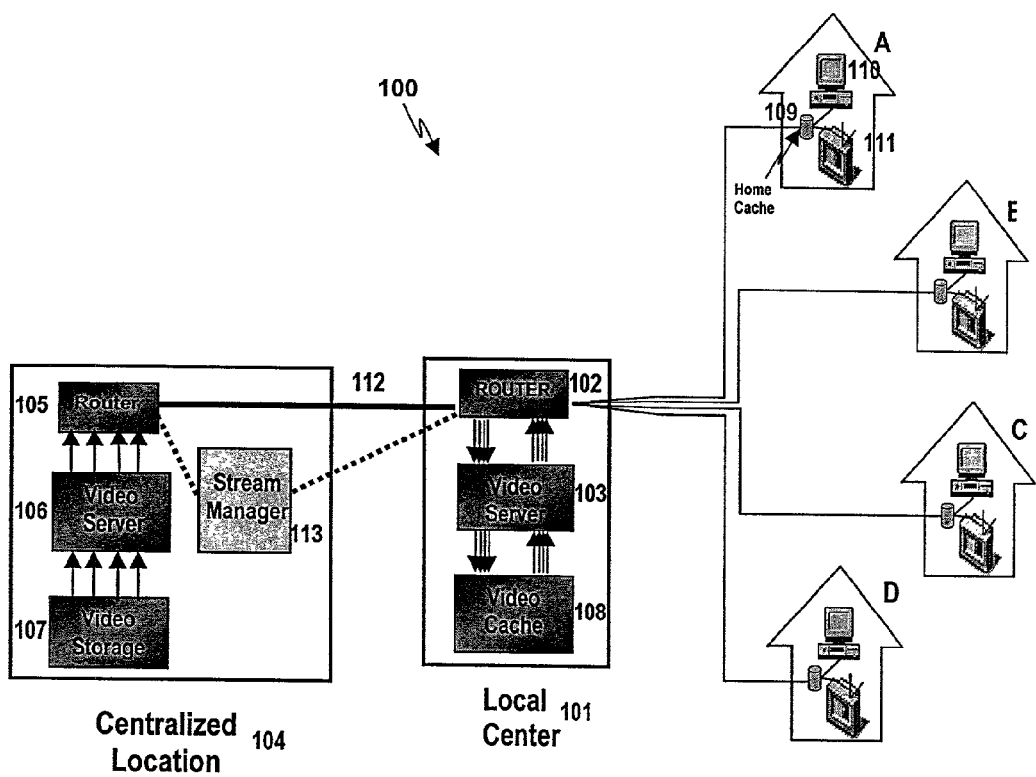
FIG. 1 illustrates the method and apparatus of playing video content archived at the centralized location

With reference to the exemplary drawings wherein like reference numerals indicate like or corresponding elements among the figures, embodiments of a system according to the present invention will now be described in detail.

FIG. 1 illustrates the concept of the utilization of a multi tier system to deliver high quality video content from a centralized source to an end user. Customer A initiates a request for a specific file of video content. This request is sent to the local center 101 and through the local center router 102 to the local center video server 103. The local center video server 103 determines that the requested video content is located at the centralized center 104 and forwards a request through local center router 102 to the centralized center router 105, which sends the request to the centralized center video server 106. The location of the specific content is identified in the centralized center video storage 107 and played back to the local center via the centralized center video server 6 and router 105. The content is received at the local center via the local router 102 and sent via the local video server 103 to the local center video cache 108.

After the local video cache has received 3–10 seconds of video content, it signals the home cache 109 that it is ready to transmit the content and after receiving an acknowledgement from the home cache, begins to transmit the video content. After the home cache has received 3–10 seconds of video content, it begins to play the material to the end user through the viewer of choice, either a personal computer 110 or a television 111. The home cache 109 and the local center video cache 108 maintain a flow of communication about the status of the fill level of the local center video cache 108 and ensures that a sufficient rate of content is transmitted to the home cache 109 to continuously enable an uninterrupted video stream to the end user.

The local center video cache 108 and the centralized center video server 106 also maintain a flow of communication about the status of the fill level of the local center video cache 108. In this case, however, the decision to transmit additional material is based both on the fill level of the cache and the available bandwidth of the transmission path 112 between the centralized center router 105 and the local center router 102. The available bandwidth will be utilized as additional customers served out of the local center make requests for video content in the same manner as Customer A described above.

Although FIG. 1 depicts a system with four end users served out of a local center, it is envisioned that any number of customers may be served from a given center. Furthermore, as the network expands in size, an additional tier(s) of serving centers may be inserted between the centralized center 104 and the local center 101.

Bandwidth prioritization is controlled by the stream manager 113 which dynamically allocates available bandwidth to individual video streams based on an algorithm that sends more content to the local center video cache when there is available bandwidth and less when the transmission path 112 is nearing its overall capacity.

As an individual video stream serving an end user from local center video cache 108 begins to reach the low end of its designated fill level, that stream is assigned a higher bandwidth priority when compared to caches for other video streams that are fuller. That priority is maintained until the cache supporting that individual stream is refilled to its threshold level. When overall demand for bandwidth on the transmission path 112 is light, the stream manager 113 will opt to fill the individual caches supporting requesting end users to capacities exceeding nominal fill levels in order to optimize the use of the dedicated transmission capacity. This will enable less bandwidth to be supplied to these caches in subsequent time increments when other end users make requests for video content or when the aggregate bandwidth for all streams is relatively high.

Although FIG. 1 depicts a single transmission path between the centralized location (center) 104 and the local center 101, it is contemplated that multiple physical transmission links can be implemented, depending on the overall engineered traffic volume. In the case of high volume of video data, the stream manager 113 also implements a load balancing algorithm to optionally distribute the total volume of traffic over the multiple transmission links, including transmission over the public Internet for lower priority traffic which has to be transmitted between the centralized center 104 and the local center 101. A similar load balancing algorithm can be implemented for distribution of traffic through multiple networks between the local center 101 and the home cache 109.

Utilization of the local center video cache 108 allows for the opportunity for the local center video server 103 to signal the video server 106 at the national center to retransmit data packets when they have been lost or corrupted during transmission. Upon retransmission, lost packets can be inserted into the video cache 108 in the correct sequence prior to transmitting the information to the home cache 109. Similarly, the video decoder located in the television 110 (or a set top box adjunct) or in the personal computer 111, will have an opportunity to signal the local center video server 103 for retransmission when a packet has been lost or corrupted during transmission from the local center to the home. Upon retransmission, lost packets can be inserted into the home cache 109 in the correct sequence prior to transmitting the information to the computer or television of the end user.

Figure 2:
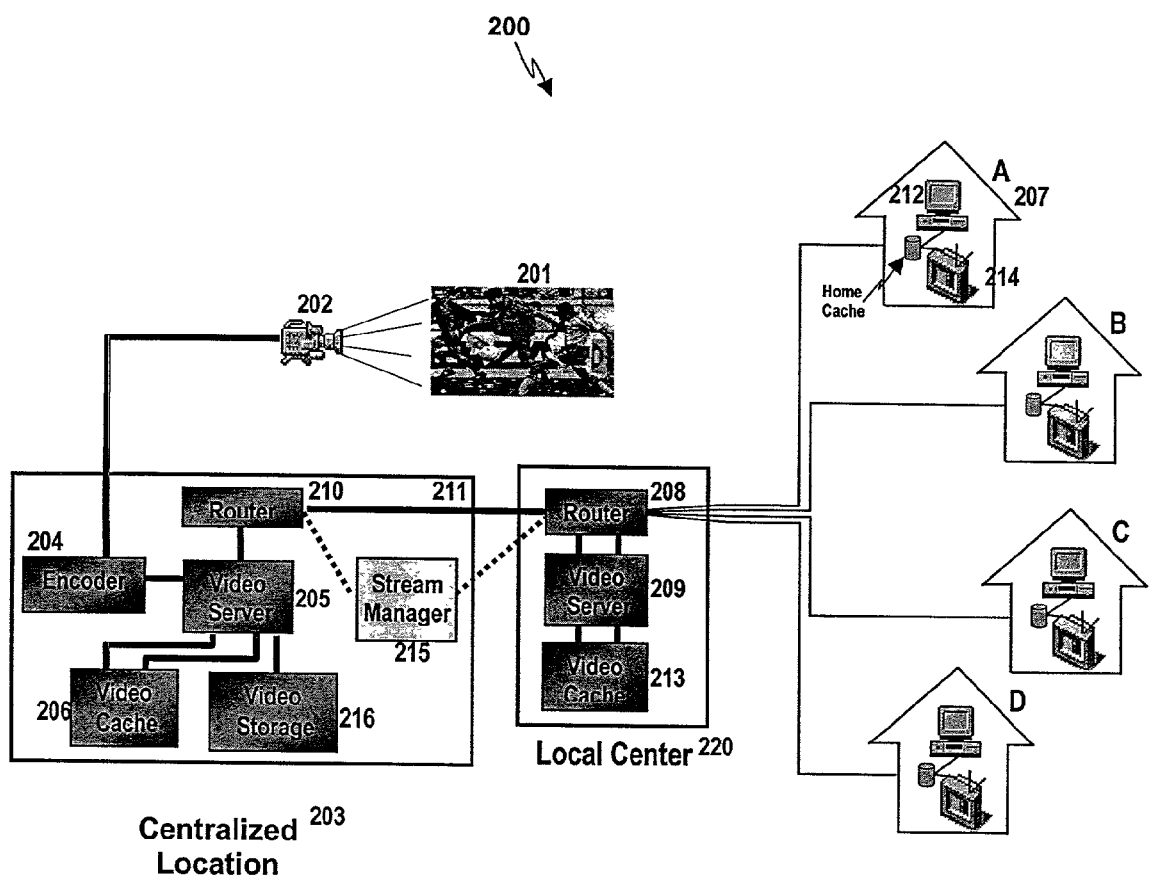
FIG. 2 illustrates the method and apparatus of playing live video content transmitted through the centralized location

FIG. 2 illustrates the concept of the utilization of a multi tier system to deliver high quality live video material via a centralized source to end-users. Source material 201 is captured utilizing a video camera 202 and transmitted to the video encoder 204 at the centralized center. Alternatively, the encoder could be co-located at the recording site in order to conserve transmission bandwidth from the recording site to the centralized center. After the content is encoded, it is placed in a video cache 206 at the centralized location and streamed out to the local center via the video server 205 and the centralized center router 210 over a dedicated transmission path 211. The video content is received in the local center by the router 208 and directed by the video server 209 to the local center video cache 213.

If Customer A initiates a request for a specific file of video content, this request is sent to the local center and through the local center router 208 to the local center video server 209. The video server locates the content in the local center video cache 213 and begins to transmit the live video content from the video cache 213 to the home cache 214.

Unlike the previous example of playing back pre-recorded content, the cache sizes in the centralized, local and home caches must be kept relatively small, in the range of 1–10 seconds, in order to maintain the "live" characteristic of the broadcast. Also unlike the previous example, the live content is sent from the centralized center to the local center after Customer A requests it but should additional customers served from the local center request the content, it is sent out to those customers from the local center video server 209 through the local center router 208 using an existing process called multicasting without having to replicate bandwidth in transmission path 211 or resources in the centralized center.

Because of the time sensitive nature of the live material and the need to keep these queues small throughout the network, the stream manager 215 assigns a higher priority to live streams when compared to the prerecorded streams in the previous example in order to assure that the caches supporting live material remain within their thresholds. Retransmission of lost or corrupted packets for live streams is assigned the highest priority by the stream manager 215.

Content Producers who are sending live video content will also have the option of recording and storing their content as it is being sent out live. In this case, the material will be simultaneously stored in the centralized location video storage 216 and made available for customer access as previously described in FIG. 1.

Figure 3A:
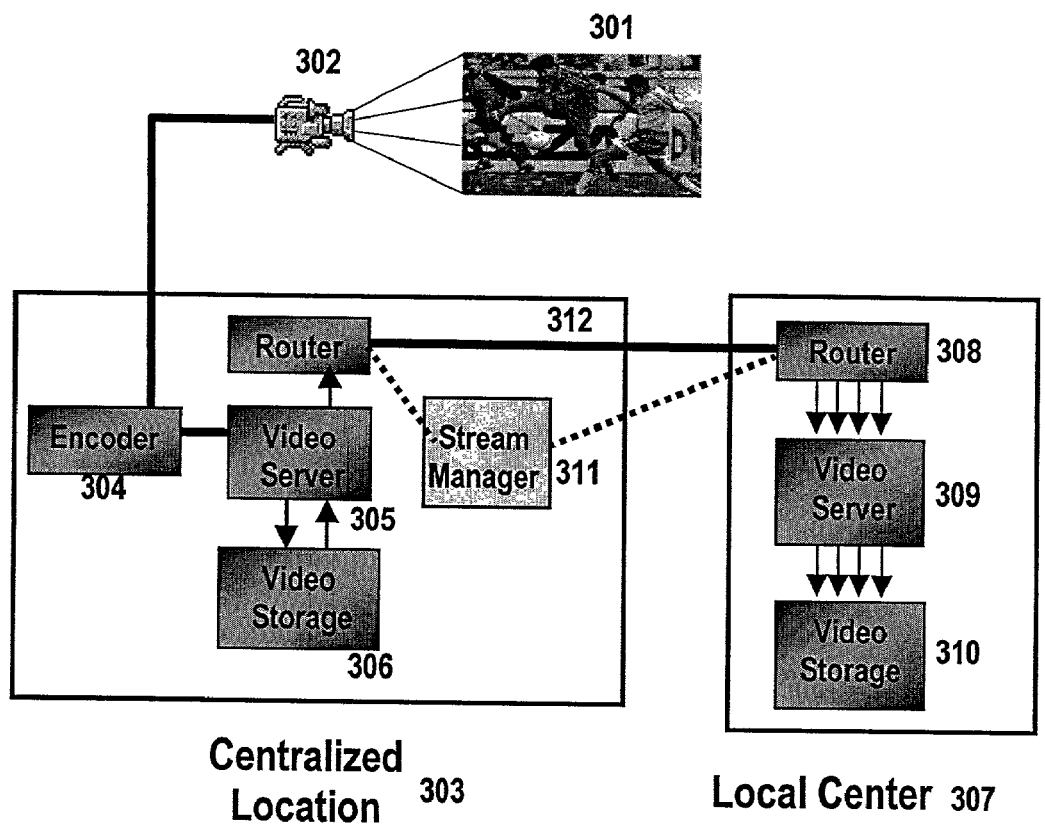
FIG. 3A illustrates the method and apparatus of archiving video content at the local center

FIG. 3a illustrates the concept of proactively sending content from the centralized location 303 to the local centers 307 when there is a high probability that the content will be viewed by several or more of the end users served out of the local center. Source material 301 is produced and recorded 302 and transported to the centralized location 303 in a number of possible ways, including direct transmission, file transfer, physical delivery, etc., depending upon the preference of the content producer.

Upon receipt, the content is encoded 304 and routed via the video server 305 to a storage location 306. An availability schedule is negotiated with the content producer and an assessment is made between the content producer and the centralized location management as to whether the content is expected to be viewed frequently enough to warrant its proactive storage at one or more of the local centers.

If the decision is made to utilize local storage, the stream manager 311 is assigned the task of allocating network bandwidth on the transmission path 312. This task will normally be assigned a lower priority than the live and on demand pre-recorded content being transmitted over the transmission path 312 since it will not be as time sensitive. However, if bandwidth is available, the stream manager 311 will allocate additional bandwidth to the transmission of the video content designated for local archiving. If there is still available bandwidth after all of the content scheduled for local archiving has been delivered, the stream manager 311 will communicate with the content management software within the video server 305 and determine if additional content stored at the centralized location 306 would be a candidate for local archiving based on any one or a combination of the following parameters:

1. Available storage space in the local center video storage 310: The greater the amount of storage space available at the local center the greater the amount of additional content that will be archived at the local center and vice versa.
2. History of the content being previously accessed by end users served by that local center 307: The more frequently a video content is accessed by the end users, the higher the priority of the video content for local storage and vice versa.
3. History of similar content being previously accessed by end users served by that local center 307: The more frequently a video content is accessed by the end users, the higher the priority of similar video content for local storage and vice versa.

Figure 3B:
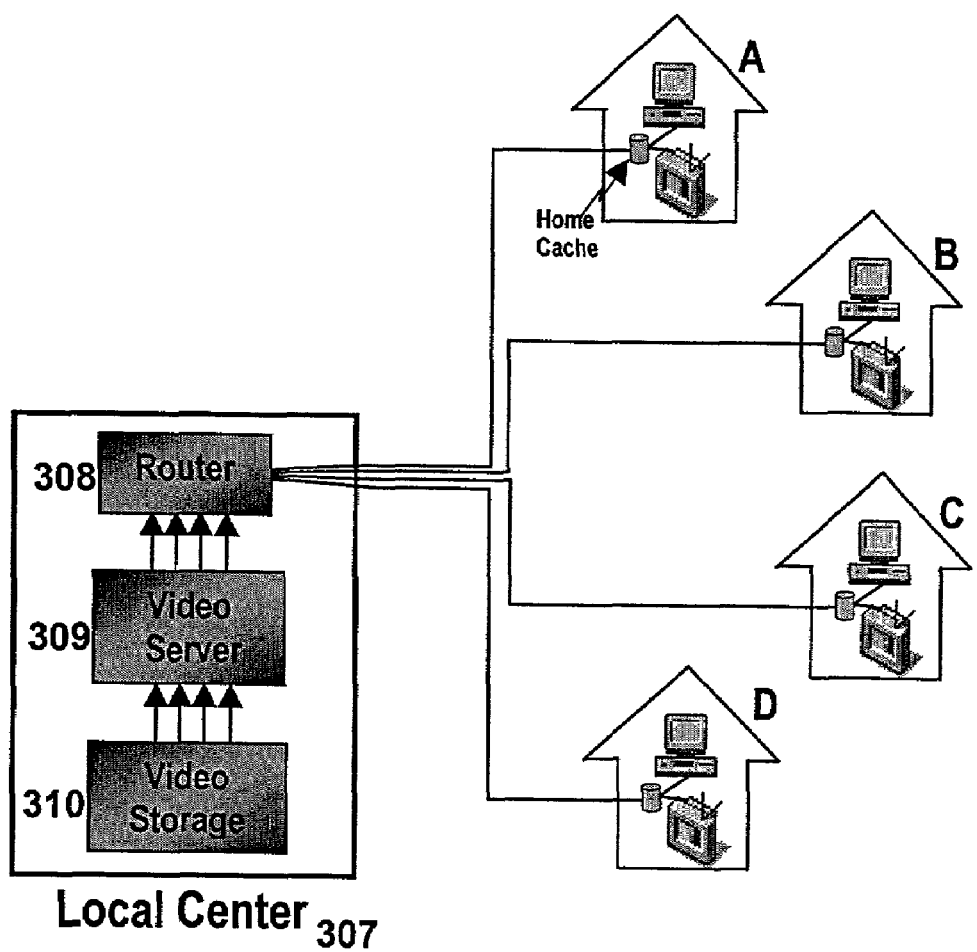
FIG. 3B illustrates the method and apparatus of playing video content archived at the local center

FIG. 3b illustrates the concept of playing out the video content that is proactively archived at the local center. This is currently being performed by numerous video server suppliers and does not constitute a part of this invention. However, the overall system for integrating and efficiently managing the three types of video traffic (archived content at a centralized location, live content, and archiving and playing content from a local center) is an integral component of the invention.

It is important to note that within the communication system described above, the stream manager plays various important roles which include the following:
1. The stream manager prioritizes the transmission of the various streams based on a combination of the following:
   i. The type of traffic which may be live or centrally stored.
   ii. The amount of material remaining in the caches which require refreshing. The lower the remaining material in the caches the higher the priority of transmission.
   iii. The speed at which the end user is viewing the material. If a particular video material is being viewed at a higher speed than other materials, the material will be given higher priority of transmission.
   iv. The necessity to retransmit data due to corruption and lost packets.
2. The stream manager also determines the instantaneous amount of bandwidth required to transmit the video information to each end user and staggers the transmission of high bandwidth instants with lower bandwidth instants in other video data streams to produce a smoother, aggregated stream that is more efficient to transport over the video delivery network.
3. The stream manager determines which video content is a candidate for storage at the local facility based on the criteria described above.
4. The stream manager determines the load on the network and implements a load balancing algorithm to optionally distribute the total volume of traffic over multiple networks including among others, the public Internet.

The above description is illustrative and not restrictive. The scope of the invention should, therefore, be determined not with reference to the above description, but instead should be determined with reference to the appended claims along with their full scope of equivalents.

What is claimed is:

1. A communications system for transporting multiple individual video streams from a centralized location to multiple end user devices, the system comprising:
   a network that transmits the multiple individual video streams from a centralized location to a local center located nearer than the centralized location to the multiple end user devices;
   a video cache at the local center capable of receiving the multiple individual video streams from the centralized location;
   multiple customer premises devices capable of receiving the multiple individual video streams from the video cache; and
   a stream manager that controls the multiple individual video streams from the centralized location to the local center,
   wherein the stream manager is configured to control bandwidth prioritization between the centralized location and the local center, and
   wherein the bandwidth prioritization is controlled by the stream manager such that as an individual video stream reaches a low fill level in the video cache at the local center, that individual video stream is assigned a higher bandwidth priority when compared to other individual video streams that have fuller fill levels.

2. The system of claim 1, wherein the network comprises any one or a combination of multiple packet based networks, wherein the network carries video data and carries control communications between the stream manager and the video cache.

3. The system of claim 1, wherein the network comprises any packet based network, wherein the network carries video data, the system further comprising communication links, wherein the communication links carry control communications between the stream manager and the video cache.

4. The system of claim 1, wherein the video cache at the local center is capable of receiving video data from the centralized location at a transmission speed faster than the speed at which an end user device is capable of viewing the material.

5. The system of claim 1, wherein the video cache at the local center is further capable of determining when a data packet has been corrupted or lost during transmission and signaling to the centralized location to retransmit the data packet.

6. The system of claim 1, wherein a video cache based at the customer premises is capable both of receiving video data from the video cache at the local center at a speed faster than a speed at which the end user device is capable of viewing the video data and is capable of delaying the viewing of the video data for 3 to 30 seconds to allow for a buffer to be created.

7. The system of claim 6, wherein the video cache based at the customer premises is further capable of determining when a data packet has been corrupted or lost during transmission and signaling to the video cache at the local center to retransmit the data packet.

8. The system of claim 1, wherein the multiple individual video streams include both previously stored video and live broadcast video.

9. The system of claim 1, wherein the stream manager is further configured to determine whether video content stored at the central location is a candidate for archiving at the local center based upon:
   available storage space in video storage at the local center;
   history of the content being previously accessed by end users served by that local center; and
   history of similar content being previously accessed by the end user devices served by that local center.

10. The system of claim 1, wherein the stream manager is further configured to prioritize transmission of the multiple individual video streams based on a combination of:
   a type of video data of an individual video stream;
   an amount of video data of the individual video stream remaining in the caches which require refreshing;
   a speed at which the end user is viewing the individual video stream; and
   a necessity to retransmit data due to corruption of video data and lost data packets of the individual video stream.

11. The system of claim 1, wherein the stream manager is further configured to determine a total volume of video data being transmitted over the network and distribute the total volume of video data over multiple networks, including transmission over a public Internet.

12. The system of claim 1, wherein the stream manager is further configured to determine an instantaneous amount of bandwidth required to transmit an individual video data stream to each end user device and staggers transmission of high bandwidth instants with lower bandwidth instants in other individual video data streams to produce a smoother, aggregated stream between the centralized location and the local center.

13. A method of transporting multiple individual video streams from a centralized location to multiple end user devices, the method comprising:
   transmitting, via a network, the multiple individual video streams to a local center located nearer than a centralized location to the multiple end user devices;
   receiving, at a video cache at the local center, the multiple individual video streams from the centralized location;
   receiving, at the end user devices, the multiple individual video streams from the video cache; and
   controlling, via a stream manager, the multiple individual video streams from the centralized location to the local center,
   wherein the stream manager controls bandwidth prioritization between the centralized location and the local center, and
   wherein the bandwidth prioritization is controlled by the stream manager such that as an individual video stream reaches a low fill level in the video cache at the local center, that individual video stream is assigned a higher bandwidth priority when compared to other individual video streams that have fuller fill levels.

14. The method of claim 13, wherein the network comprises any one or a combination of multiple packet based networks, wherein the network carries video data and carries control communications between the stream manager and the video cache.

15. The method of claim 13, wherein the network comprises any packet based network, wherein the network carries video data, the system further comprising communication links, wherein the communication links carry control communications between the stream manager and the video cache.

16. The method of claim 13, wherein the video cache at the local center is capable of receiving video data from the centralized location at a transmission speed faster than a speed at which the end user device is capable of viewing the video data.

17. The method of claim 13, wherein the video cache at the local center is further capable of determining when a data packet has been corrupted or lost during transmission and signaling to the centralized location to retransmit the data packet.

18. The method of claim 13, wherein a video cache based at the customer premises both receives video data from the video cache at the local center at a speed faster than the end user device is capable of viewing the video data and is capable of delaying the viewing of the video data for 3 to 30 seconds to allow for a buffer to be created.

19. The method of claim 18, wherein the video cache based at the customer premises is further capable of determining when a data packet has been corrupted or lost during transmission and signaling to the video cache at the local center to retransmit the data packet.

20. The method of claim 13, wherein the multiple individual video streams include both previously stored video and live broadcast video.

21. The method of claim 13, wherein the stream manager determines whether video content stored at the central location is a candidate for archiving at the local center based upon:
   available storage space in video storage at the local center;
   history of the content being previously accessed by end users served by that local center; and
   history of similar content being previously accessed by end user devices served by that local center.

22. The method of claim 13, wherein the stream manager prioritizes transmission of the multiple individual video streams based on a combination of:
   a type of video data of an individual video stream;
   an amount of video data of the individual video stream remaining in the caches which require refreshing;
   a speed at which the end user device is displaying the individual video stream; and
   a necessity to retransmit data due to corruption of video data and lost data packets of the individual video stream.

23. The method of claim 13, wherein the stream manager determining the determines a total volume of video data being transmitted over the network and distributes the total volume of video data over multiple networks, including transmission over a public Internet.

24. The method of claim 13, wherein the stream manager determines an instantaneous amount of bandwidth required to transmit an individual video data stream to each end user device and staggers transmission of higher bandwidth instants with lower bandwidth instants in other individual video data streams to produce a smoother, aggregated stream between the centralized location and the local center.

* * * * *